Patented July 15, 1952

2,603,668

UNITED STATES PATENT OFFICE 2,603,668

FLOOR COVERING RUBBER COMPOSITION

Roelof Houwink, Wassenaar, and Wybrand Johan Karel Schönlau, Haarlem, Netherlands, assignors to Rubber-Stichting, Delft, Netherlands No Drawing. Application August 5, 1949, Serial No. 108,866. In the Netherlands August 6, 1948

3 Claims. (Cl. 260—750)

The invention relates to a process for the manufacture of rubber articles by the vulcanization of a suitably compound and shaped rubber mixture at room temperature or at a slightly elevated temperature.

The principal object of the present invention is to provide a method for the manufacture of preshaped rubber articles at room temperature or at a slightly elevated temperature. Another object of the invention is to provide a process for the manufacture of rubber articles from crude rubber which does not require the use of heavy and expensive vulcanizing apparatus. Other objects of the invention include the provision of a rapid and economical process for the manufacture of rubber articles suitable as floor or wall covering materials.

It is well known that rubber articles can be produced from a mixture containing, aside from rubber and vulcanizing ingredients, large quantities of fillers such as whiting, kaoline and the like. Such fillers are usually added to make a cheaper product, while sometimes they can confer special properties on the final product. Cheap fillers which are often used include: wood flour, ground cork, shredded straw and similar finely divided waste material of vegetable origin.

When producing rubber articles from solid rubber, such as crepe or sheet rubber, if desired containing large amounts of fillers, the mixture has always been shaped and vulcanized by the application of heat and pressure in a suitable vulcanizing press. The known compounds containing wood flour, or a similar finely divided fibrous substance of vegetable origin, necessitated also a similar vulcanization process to produce a useful product. This vulcanization step using expensive machinery rendered the product, which should be cheap because of its composition, expensive.

It is also known to compose a rubber mixture which will vulcanize at a low temperature by including special accelerators, which are usually called ultra-accelerators, with the mixture. The use of ultra-accelerators is especially advantageous when the rubber which is used as a starting material is in such a shape that the compounding ingredients can be mixed with the rubber without the application of heat, e. g. by dispersing the ingredients in rubber latex and coagulating the mixture. If, however, the compounding of the rubber involves a step in which the mixture is heated, ultra-accelerators should not be used, because the vulcanization is accelerated by the heating and scorching can not be avoided. Thus, it has not been possible to mix vulcanization ingredients including an ultra-accelerator with solid rubber in a mill or in a mixer of the Banbury type, because too much heat is developed during this process.

It has been discovered that the presence of large amounts of wood flour or similar finely divided material of vegetable origin affects the vulcanization with ultra-accelerators unfavourably. Using a vulcanization temperature at which a mixture containing vulcanization ingredients including an ultra-accelerator will vulcanize within a few hours, the same mixture containing a relatively large amount of wood flour will not show any signs of vulcanization for several weeks under the same conditions. Apparently, the ultra-accelerators are inactivated by the presence of a large amount of finely divided material of vegetable origin, or of particular constituents thereof. Even at the temperature, which is generally used when compounding rubber on the mill, the activity of the ultra-accelerators is diminished in such a degree by the presence of relatively large amounts of wood flour or similar materials that scorching can easily be avoided.

It has also been discovered that the activity of the ultra-accelerators, in the vulcanization of rubber at room temperature or at a slightly elevated temperature can still further be enhanced by the addition of certain amines. Surprisingly, however, we have discovered that the addition of activating amines to the rubber mixture containing vulcanization ingredients including an ultra-accelerator and a relatively large amount of finely divided material of vegetable origin does not accelerate the vulcanization during the compounding process in such a degree that scorching can not be avoided, but that the subsequent vulcanization of the readily compounded and shaped mixture at room temperature or at slightly elevated temperature is sufficiently accelerated to be technically applicable.

In the operation of the process of the present invention, rubber is mixed on any suitable machinery with a relatively large amount of fillers including finely divided fibrous material of vegetable origin in an amount of between 100 and 300 per cent by weight calculated on the rubber and with vulcanizing ingredients including an ultra-accelerator. An amine is also incorporated with the mixture, as well as a softener, pigment, and other substances which may be used to impart special properties upon the final product. The readily compounded mixture, while still in its plastic state, is thereupon moulded to its final shape and allowed to vulcanize at room temperature or at a slightly elevated temperature, without the application of pressure.

Our invention can be explained in greater detail by reference to the following specific examples which describe operating embodiments of our process. The first of these examples illustrates the manufacture of sheet material from a composition comprising wood flour, wherein a xanthogenate is used as an ultra-accelerator and a simple aliphatic amine as an activator, showing particularly the order of mixing which we prefer.

*Example 1*

Mixtures A and B were prepared containing the following ingredients (all parts are by weight):

|  | A | B |
|---|---|---|
| Rubber (smoked sheet) | 100 | 100 |
| zinc oxide | 5 | 5 |
| ozocerite | 2 | 2 |
| kaoline | 100 | 100 |
| wood flour (60 mesh) | 150 | 150 |
| pigment (iron oxide) | 5 | |
| accelerator (Robac Gamma) | 2 | |
| dibutylamine | 2 | |
| sulfur | | 4 |

These mixtures contain together all the necessary ingredients, but are separately unable to vulcanize under the circumstances prevailing during the compounding. Equal parts of the mixtures A and B are thereupon mixed together, whereby the colour imparted by the pigment shows whether the mixture has become sufficiently homogeneous. The mixture is then sheeted out on a calender into a sheet of the desired thickness, which is rolled upon a bobbin and stored in the vulcanization chamber. The hardness of the material was tested after regular time intervals by means of a Shore A durometer, and vulcanization was assumed to be completed when a hardness of 85 was reached. This was obtained in about four weeks.

The time after which this was reached at various temperatures appears from the following table:

| Temperature of vulcanization | 70° C. | 40° C. | 20° C. |
|---|---|---|---|
| time of vulcanization | 3-4 h. | 2-3 days | 4 weeks. |

The 100 parts of kaoline are added to decrease still further the cost of the mixture; they can be replaced by equal or smaller amounts of whiting, microdolomite, hard or soft rubber makers' clay, or up to 175 parts of barytes or other inert mineral fillers, without influence on the properties of the final product.

*Example 2*

This example illustrates the manufacture of rubber articles, using various amounts of inert fillers. Mixtures were prepared containing the following ingredients, in parts by weight:

|  | a | b | c | d |
|---|---|---|---|---|
| rubber (crepe) | 100 | 100 | 100 | 100 |
| zinc oxide | 5 | 5 | 5 | 5 |
| stearic acid | 1 | 1 | 1 | 1 |
| paraffin (M. P. 60–62° C.) | 2 | 2 | 2 | 2 |
| pigment | 3 | 3 | 3 | 3 |
| sulfur | 2 | 2 | 2 | 2 |
| zinc dibutyldithiocarbamate | 1 | 1 | 1 | 1 |
| triethylenetetramine | 1 | | 1 | |
| wood flour | | 200 | 150 | |
| hashed straw | 200 | | | |
| kaoline | 100 | | | |
| whiting | | 100 | | |
| microdolomite | | | 100 | 250 |
| Vulcanization complete after: | | | | |
| days at 40° C. | 2 | 2 | 2 | 2 |
| weeks at 20° C. | 3 | 2 | 3 | 2 |

Mixture d, which contained no fibrous filler and no amine, could only be prepared on a laboratory mill, using special precautions to avoid scorching.

The mechanical properties of the vulcanized compositions produced from the mixtures a, b and c are:

Tensile strength _____kg./cm.² __ 40–50
Hardness _____Shore A __ 85–90
Elongation _____per cent __ 15–20

The product from mixture d had a much lower hardness and a higher elongation.

*Example 3*

This example illustrates the use of various ultra-accelerators, in a composition containing di-normal butylamine as an activator. The mixture consists of:

Rubber _____ 100
Zinc oxide _____ 5
Kaoline _____ 100
Wood flour _____ 200
Ozocerite _____ 2
Stearic acid _____ 1
Pigment _____ 2
Sulfur _____ 2
Di-n-butylamine _____ 2
Ultra-accelerator _____ 1

| Accelerators used | Vulcanization completed after— | | |
|---|---|---|---|
|  | hours at 70° C. | days at 40° C. | weeks at 20° C. |
| zinc di-butyl dithiocarbamate | 3 | 2 | 2 |
| zinc di-ethyl dithiocarbamate | 2 | 3 | 6 |
| zinc dimethyl dithiocarbamate | 5 | 4 | 8 |
| zinc ethyl phenyl dithiocarbamate | 2 | 2 | 5 |
| zinc pentamethylene dithiocarbamate | 5 | 6 | 8 |
| piperidine pentamethylene dithiocarbamate | 4 | 3 | 4 |
| zinc isopropyl xanthate | 2 | 1 | 4 |
| Robac gamma (mixture of xanthates) | 3 | 2 | 3 |

The mixtures were calendered and vulcanized at various temperatures as shown. Experiments have revealed that the hardness, as measured with a Shore A durometer, can be used as an effective indicator for the degree of vulcanization. A hardness of 85 units indicates that the vulcanization has been completed, the other mechanical properties having reached their optimum value after about the same vulcanization time as is needed to reach this hardness.

*Example 4*

This example illustrates the use of various amines as activators in the mixture containing our preferred ultra-accelerators, zinc dibutyldithiocarbamate (A) and Robac Gamma (B), showing the influence of the basicity of the amine used.

The following mixtures were tested:

|  | A | B |
|---|---|---|
| rubber | 100 | 100 |
| zinc oxide | 5 | 5 |
| paraffin | 2 | 2 |
| stearic acid | 1 | 1 |
| pigment (iron oxide) | 2,5 | 2,5 |
| whiting | 100 | 100 |
| wood flour | 200 | 200 |
| sulfur | 2 | 2 |
| Zn dibutyldithiocarbamate | 1 | |
| Robac Gamma | | 1 |
| amine | varied | varied |

| amine used | parts—100 p. of rubber | hours at 70° C. | days at 40° C. | weeks at 20° C. | hours at 70° C. | days at 40° C. | weeks at 20° C. |
|---|---|---|---|---|---|---|---|
| none | | | 48 | | 15 | 12 | |
| di-n. butylamine | 2 | 3 | 3 | 2 | 4 | 3 | 3 |
| triethanolamine | 2, 6 | 3 | 2 | 2 | 3 | 3 | 6 |
| piperidine | 1, 3 | 2 | 2 | 2 | 4 | 4 | 6 |
| triethylamine | 1, 4 | 3 | 4 | 5 | 4 | 3 | 4 |
| n. butylamine | 1, 2 | 3 | 2 | 5 | 3 | 3 | 6 |
| pyridine | 1, 3 | 3 | 6 | | 6 | 8 | |
| triethylene tetramine | 1 | 3 | 1 | 2 | | | |
| amino ethyl ethanolamine | 2 | 2 | 1 | 2 | | | |

The table shows the time after which vulcanization was completed. Pyridine, having the lowest dissociation constant of the amines tested, has insufficient activating effect.

It is evident that there are numerous factors which will influence conditions for the most satisfactory operation of the present invention, the actual limits of which cannot be established except by a detailed study of each set of starting materials and the intermediate and finished products involved. The vulcanization time can still further be reduced by increasing the temperature up to 70° C., or still higher, but the special advantages of the process of our invention are not longer obvious, when the vulcanization temperature surpasses considerably 50° C.

It is remarkable that a smooth and sufficiently dense surface of the finished article produced according to our invention can be obtained by calendering only, whereas until now it has always been regarded necessary to vulcanize the articles under pressure to produce a similar appearance. The use of too high a vulcanization temperature, though causing a considerable decrease in vulcanization time, may give rise to the formation of blisters or other irregularities on the surface, when no pressure is applied during the heating.

The ultra-accelerators which can be used in the process of the present invention are the commercially available accelerators which are known to be able to vulcanize a rubber mixture at room temperature, or at a slightly elevated temperature. Examples of such ultra-accelerators are the dithiocarbamates, such as zinc dialkyl dithiocarbamates which are available with methyl, ethyl and butyl, standing for alkyl, and zinc penta methylenedithiocarbamate, and zinc alkyl phenyl dithiocarbamate. Also the accelerator known as "Pip-pip," which is piperidine pentamethylene dithiocarbamate, can be used as an ultra-accelerator in the process of the present invention. Other suitable ultra-accelerators are the xanthogenates such as zinc isopropylxanthate, zinc ethylxanthate, dithiobutylxanthate, and the accelerator "Robac Gamma," sold by Robinson Brothers, Ltd., and believed to be a mixture of zinc salts of various xanthates.

Though all the ultra-accelerators mentioned above appear to be useful in the process of the present invention, we prefer to use the zinc dialkyl dithiocarbamate, more specifically the zinc dibutyl dithiocarbamate, as this accelerator appears to give the fastest vulcanization at room temperature. It has been established by a number of experiments that a mixture vulcanized according to the present invention with the ultra-accelerator zinc dibutyldithiocarbamate requires about 2 weeks at 20° C. to reach a hardness of 85 Shore A, whereas the other known ultra-accelerators require times up to several weeks longer to reach the same hardness. By vulcanizing at about 40° C. this vulcanization time can be considerably reduced; a mixture containing zinc dibutyldithiocarbamate as an ultra-accelerator requires about 2 days to reach the desired hardness, whereas mixtures containing other accelerators usually require about 3 or more days.

The amines required in our process are preferably the organic amines having a low volatility and a basicity greater than $10^{-5}$. The terms "basicity" is used to denote the first dissociation constant of the compound in aqueous solution. Experiments have shown that the amines having a basicity of less than $10^{-5}$ have less action, while the use of volatile amines has the disadvantage that a part of the amine escapes during the mixing by volatilization. This causes loss in amines but is also objectionable because of the disagreeable odour of these compounds. Examples of amines which are suitable in the process of the present invention are dinormal butylamine, triethanolamine, triethylenetetramine and amine-ethyl ethanol amine. Our experiments have shown that every amine which satisfies the conditions mentioned above can be used as an activator in the process of our invention. The amine is preferably added in an amount corresponding with from about 4 to 16 mols per 100 kgs. of rubber, or about 1 to 3 per cent by weight calculated on the rubber.

The finely divided fibrous filler required in the process of our invention is preferably wood flour, which is inexpensive and easily obtainable. However, other substances of vegetable origin, such as hashed straw, ground cork, cotton linters and the like, can also be used. An amount of fibrous filler at least equalling the amount of rubber should be used, whereby very desirable properties are obtained in the final product. A smooth surface is obtained by calendering only, and the use of pressure during the vulcanizing is entirely obviated. Moreover, the sheets of compounded and calendered material can be stacked or the sheet can be rolled upon itself without any intermediate layer of separating material being necessary. When the vulcanization is effected at a temperature below about 50° C. the cured sheets can be separated from each other without causing damage to the surface. Furthermore, the fibrous material aids in processing the mixture as set forth hereinabove.

An upper limit to the amount of fibrous filler used is put by the fact that a rubber mixture containing more than about 300 or 350 parts of filler can be handled only with difficulty. We prefer to use an amount of between 150 and 200 parts of fibrous filler, together with up to 100 parts of inert mineral filler, for every 100 parts of rubber.

The rubber articles manufactured according to our invention are not only cheap because of the use of an inexpensive filler and a cheap production method, but when used as a floor covering material they possess the added advantage that they need not be adhesively secured to the underlayer, because this floor covering material comprises a considerable amount of fibrous filler, does not "creep," as does a rubber floor covering material containing substantially no fibrous filler.

It is recommended to add solid, wax-like softeners to the mixture, which aid in improving the surface layer of the material. Without these softeners, the surface appears to be easily damaged by scratching with a hard object; the scratches formed are only difficult to remove. By mixing with the composition from one to several per cent of a solid wax-like substance having a limited solubility in the rubber at room temperature, this disadvantage is entirely eliminated. It is believed that the thin layer of wax-like softener which forms on the surface of the rubber article by the "sweating out" of the softener during the vulcanization or storing protects the surface against scratching. Suitable softeners are ozocerite, paraffin having a melting point above room temperature, Vaseline and beeswax. Also carnauba wax appears to be useful, though of this wax a quantity of several per cent is necessary to impart the desired properties to the surface layer.

A synthetic rubber, or a reclaimed rubber, which has vulcanization characteristics similar to those of natural rubber, can be used instead of natural rubber in the process of our invention. An example of a suitable synthetic rubber is the rubber obtained by copolymerizing butadiene with styrene, known as GR–S. Satisfactory results are obtained by replacing up to 50 per cent of the rubber by reclaimed rubber, moreover, the rubber can be wholly or in part replaced by the cheaper inferior grades of plantation rubber, such as blankets.

What we claim is:

1. A smooth, dense, flexible, removable, non-creep, scratch resistant floor covering comprising a hardened mixture of rubber, about 100 to 300% of at least one finely divided fibrous vegetable material selected from the group consisting of wood flour and straw, about 100% of an inert mineral filler selected from the group consisting of kaolin, whiting and microdolomite, about 1% of an ultra-accelerator, about 1 to 3% of a 2 to 8 carbon amine of low volatility and having a basicity greater than $10^{-5}$, about 1 to 5% of a solid softener, and sulfur, vulcanized at a temperature of 20° to 50° C. in the absence of pressure.

2. A smooth, dense, flexible, removable, non-creep floor covering comprising a hardened mixture of rubber, about 150 to 200% of at least one finely divided fibrous vegetable material selected from the group consisting of wood flour and straw, about 100% of an inert mineral filler, about 1% of an ultra-accelerator, about 1 to 3% of a 2 to 8 carbon amine of low volatility and having a basicity greater than $10^{-5}$, and sulfur, vulcanized at a temperature of 20° to 50° C. in the absence of pressure.

3. A smooth, dense, flexible, removable, non-creep, scratch resistant floor covering comprising a hardened mixture of rubber, about 150 to 200% of at least one finely divided fibrous vegetable material selected from the group consisting of wood flour and straw, about 100% of kaolin, about 1% of an ultra-accelerator, about 1 to 3% of a 2 to 8 carbon amine of low volatility and having a basicity greater than $10^{-5}$, and sulfur, vulcanized at a temperature of 20° to 50° C. in the absence of pressure.

ROELOF HOUWINK.
WYBRAND JOHAN KAREL SCHÖNLAU.

REFERENCES CITED

The following references are of record in the file of this patent:

UNITED STATES PATENTS

| Number | Name | Date |
| --- | --- | --- |
| 1,521,657 | Teague | Jan. 6, 1925 |
| 1,765,015 | Hopkinson | June 17, 1930 |
| 2,041,217 | Smithers et al. | May 19, 1936 |
| 2,056,558 | Beldam | Oct. 6, 1936 |

FOREIGN PATENTS

| Number | Country | Date |
| --- | --- | --- |
| 423,308 | Great Britain | Jan. 30, 1935 |

OTHER REFERENCES

J. Soc. Chem. Ind. Trans., vol 42, of 1923, pp. 333T–337T.